S. D. BATES.
Harvester.
No. 96,660. Patented Nov. 9, 1869.
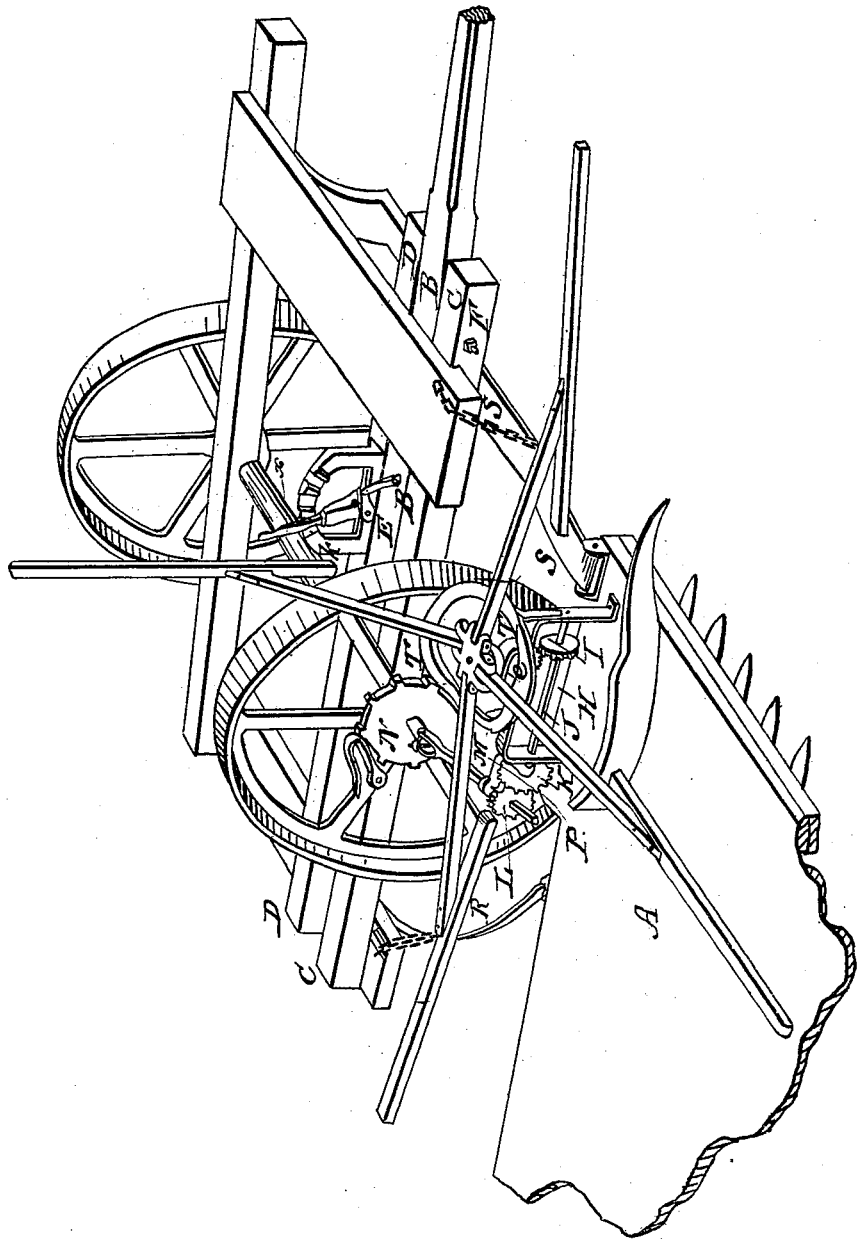

ptf
UNITED STATES PATENT OFFICE.

SAMUEL D. BATES, OF LEWISBURG, PENNSYLVANIA.

IMPROVEMENT IN HARVESTERS.

Specification forming part of Letters Patent No. 96,660, dated November 9, 1869.

*To all whom it may concern:*

Be it known that I, SAMUEL D. BATES, of Lewisburg, Pennsylvania, have invented a new and useful Improvement in Combined Reel and Rake for Harvesters; and I do hereby declare the following to be a full and exact description of the same, reference being had to the annexed drawings, making a part of this specification, which represent a harvester having a hinged bar and a revolving rake and reel attached thereon.

A represents the platform of a hinged-bar front-cut harvester, with a revolving rake and reel, supported upon the upper end of a vertical shaft, G. At the bottom of this vertical shaft a miter-wheel, H, is attached, gearing into a miter-weel, I, on a shaft, J. On the end of the shaft J is another miter-wheel, K, gearing into miter-wheel L, supported on the square coupling-shaft M, which attaches, by a universal joint, to the ratchet N.

The lower end of the shaft M is supported on a coupling-box, P, which clasps the shaft J, and, extending back beyond the periphery of wheel K, bends at right angles, and clasps the shaft M in like manner. This box P allows the free working of the gearing while the platform is rising and falling, and allows the platform to be adjusted to different heights.

At the rear end of the frame is pivoted a curved brace, R, the other end of which is pivoted to the platform, which serves, by means of a chain, to suspend the platform and rake.

The platform is connected to the main frame, in front of the driving-wheel, by a coupling-arm, s, which is also suspended to the main frame by means of a chain.

The arms of the revolving rake are independent of each other, and are controlled in their motion by means of the cam T.

The tongue is pivoted to the main frame by means of the bolt F, running through the sills C D. A link, E, is attached at one end to it, and at the other to a rocking shaft or arm, O. This arm O has a socket, U, into which a lever or bar, X, is jointed by a pin. This lever X has a spring, K', which acts in conjunction with the quadrant notched piece L', attached to the timber D, so as to hold the lever X into one of the notches, as may be desired. It will thus be seen that, as the lever X is moved back and forth, the rear end of the tongue is depressed or elevated at will, and held firmly in position by the notches in the segment L'.

What I claim, and desire to secure by Letters Patent, is—

In combination with a front-cut hinged-bar harvester, a lateral-curved rear brace, suspended by a chain from the main frame, for supporting the platform, substantially as described.

SAMUEL D. BATES.

Witnesses:
WM. H. YOUNG,
O. R. VORSE.